United States Patent
Sotriffer et al.

(10) Patent No.: US 8,026,815 B2
(45) Date of Patent: Sep. 27, 2011

(54) READING OUT OF INFORMATION USING AN OPTOELECTRONIC SENSOR AND AN RFID READER

(75) Inventors: Ingomar Sotriffer, München (DE); Harald Weber, Achern (DE)

(73) Assignee: Sick AG, Waldkirch (DE)

( * ) Notice: Subject to any disclaimer, the term of this patent is extended or adjusted under 35 U.S.C. 154(b) by 243 days.

(21) Appl. No.: 12/216,193

(22) Filed: Jul. 1, 2008

(65) Prior Publication Data

US 2009/0015380 A1    Jan. 15, 2009

(30) Foreign Application Priority Data

Jul. 2, 2007 (DE) .......................... 10 2007 030 738

(51) Int. Cl.
*G08B 13/14* (2006.01)
(52) U.S. Cl. ...................... 340/572.1; 235/382; 713/182
(58) Field of Classification Search .... 340/572.1–572.9; 235/382, 487; 713/185, 182
See application file for complete search history.

(56) References Cited

U.S. PATENT DOCUMENTS

| | | | | |
|---|---|---|---|---|
| 5,662,032 A * | 9/1997 | Baratta | ........................... | 99/513 |
| 5,682,032 A * | 10/1997 | Philipp | ........................ | 235/422 |
| 5,708,423 A * | 1/1998 | Ghaffari et al. | ................. | 340/5.8 |
| 7,100,052 B2 * | 8/2006 | Ghazarian | ..................... | 713/182 |
| 2007/0181685 A1 * | 8/2007 | Zhu et al. | ....................... | 235/454 |

FOREIGN PATENT DOCUMENTS

| | | |
|---|---|---|
| DE | 101 06 400 A1 | 8/2002 |
| EP | 1 479 575 A1 | 11/2004 |

\* cited by examiner

*Primary Examiner* — George Bugg
*Assistant Examiner* — Edny Labbees
(74) *Attorney, Agent, or Firm* — The Nath Law Group; Jerald L. Meyer; Stanley N. Protigal

(57) ABSTRACT

A device (10) is provided for the reading out of information from a transponder (14) arranged at an object (12), said device comprising an optoelectronic sensor (24), a reading device (16) able to excite the transponder (14) to radiate the information and able to read out the radiated information and a control (26) which is made for a control of the reading device (16) and of the sensor (24) as well as for an evaluation of the read out information.
In this connection, the optoelectronic sensor (24) can determine a movement pattern of the object (12) and the control (26) is made only to evaluate the read out information with objects (12) of a preset movement pattern.
A corresponding method is furthermore described.

17 Claims, 3 Drawing Sheets

READING OUT OF INFORMATION USING AN OPTOELECTRONIC SENSOR AND AN RFID READER

Figure 1:
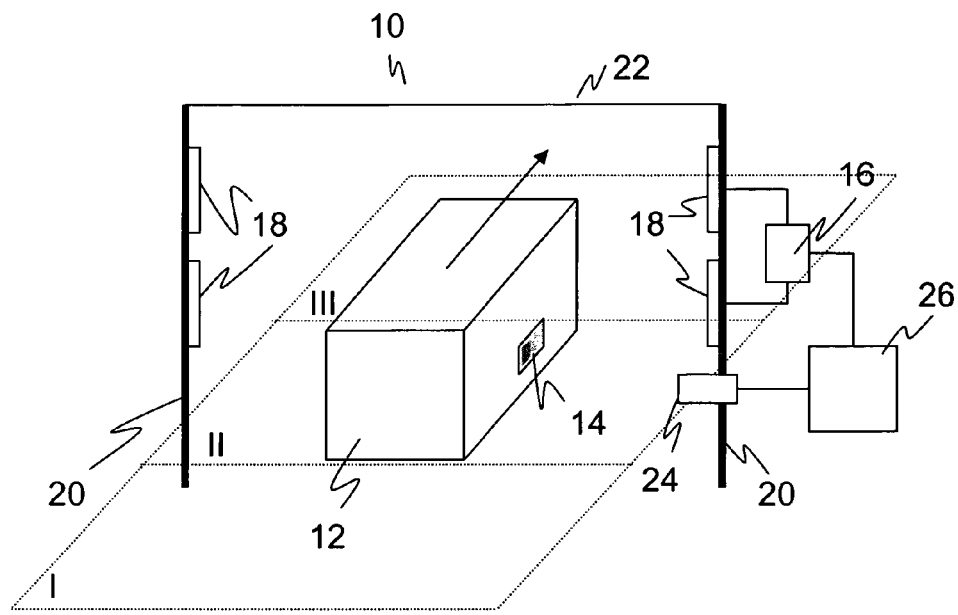

The invention relates to a device and to a method for the reading out of information using a reading device in accordance with the preamble of claim 1 and claim 13 respectively.

An identification and positional monitoring of objects and goods which is as free of error as possible is necessary for the automation of logistical movements. This takes place at identification points, above all on a change of the owner of the good or on a change of the means of transport. An automating identification system is accordingly installed, for example, at an incoming goods area of a logistics center to record incoming and outgoing goods. This results in fast and understandable logistical movements.

A conventional method for automated identification is to identify the identification carrier or the label on a loading unit or on the object conveyed by it on the passing through of this loading unit such as a pallet with the help of stationary barcode systems. The reading devices, that is barcode scanners, are triggered by a combination of light barriers arranged before them.

Attempts have been made for some time to replace the optical scanning of the barcode readers by RFID (radio frequency identification) readers. In this connection, a transponder is attached to the object to be identified instead of a barcode. Such transponders can basically be active, that is have their own energy supply and generate electromagnetic radiation independently. In practice, however, these transponders are less suitable for logistics because the unit prices for such transponders cannot reach the low level required for the mass market due to the energy supply. Passive transponders without their own energy supply are therefore usually used. In both cases, the transponder is stimulated to radiate the stored information by electromagnetic radiation of the reading device.

Whereas it was earlier usual to insert a coil into the transponder and to read it out via inductive coupling, UHF (ultra-high frequency) transponders have been employed in the meantime whose antenna is a dipole (backscatter). When a transponder and an RFID reader are spoken of here in the following, they should, however, be understood independently of the precise implementation of the technique.

When RFID readers are used for automatic identification, the difficulty arises that it is not directly clear which object read out information of a transponder belongs to. The use of a simple light barrier before the RFID reader is not sufficient because the light barrier can neither recognize the direction of movement nor make a decision on whether a ground conveyor is passing through the region with a full or an empty loading unit. Furthermore, persons can also trigger the light barriers and thus result in incorrect readings. To this extent, the association problems with RFID readers still do not differ from the conventional solutions via barcode scanners. Since, however, through reflections, RFID readers can reach transponders in ranges which are beyond the ranges without a reflecting environment, so-called "far ranges", an association is often problematic. Furthermore, due to the high difference of transmission power and reception sensitivity, the RFID readers can impede one another in the reading out of the transponders. This applies in particular to goods depots in which a larger number of RFID readers is installed.

In a conventional solution, the trigger light barriers are replaced by a combination of a light grid and a radar sensor system. The light grid can determine the height of an object conveyed to the RFID reader and can thus roughly classify the object, for example distinguish an empty ground conveyor from a loaded ground conveyor. The radar sensor measures the direction of movement via the Doppler effect. The construction effort is very high, not only because a radar sensor is needed, but rather because the latter must also be installed on a transverse bar above the object passing through in order to be able to measure the direction of movement.

It is known from DE 199 40 403 A1 to combine an RFID reader with an optoelectronic sensor, with the optoelectronic sensor scanning the object to be read out and determining its geometry. The information read out of the transponder of the object by the RFID reader likewise contains geometrical properties of the object. The objects can be identified and associated by a comparison of these geometrical properties contained in the transponder and measured by the optoelectronic sensor. However, this requires encoding the geometrical properties into the transponder and moreover the transmission of a larger amount of data which also contain these geometrical properties. In addition, it is also not possible with standardized object geometries, for example pallets, to resolve a false association occurring due to far ranges with this method. Finally, the conventional method cannot determine the direction of movement of the object to be read out. Overall, a very high effort therefore has to be exerted without really thereby being able to solve the association problem comprehensively.

Finally, a further difficult results in the use of a large number of RFID readers in spatial proximity to one another from the fact that in accordance with the underlying standard EN 302 208, only a limited number of frequency channels is available, namely five channels with a low power and 10 channels with a power of up to 2 W, which corresponds to a range of up to 80 km with the given values for the transmission power and the limit value for the channel release. If several RFID readers are active simultaneously, a free channel must be searched for in each case and, in addition, huge association problems occur due to the far range. The rules of the channel release would change by the intended change of the standard EN 302 208; however, the problem will nevertheless remain in principle.

It is therefore the object of the invention to enable the reading out of a transponder with an unambiguous association with the associated object with an effort which is as low as possible.

This object is satisfied by a device in accordance with claim 1 and by a method in accordance with claim 13. Since the optoelectronic sensor can determine a movement pattern of the object, it can be determined without ambiguity whether this object has passed the related reading device. The read information is also only evaluated in this case. Incorrect readings can thereby be reduced dramatically or be avoided completely. The advantage of the solution in accordance with the invention can be found not only in the thus greatly improved reading rate, but also in a faster evaluation and transmission of the information because only relevant data have to be evaluated and a lot of information is already filtered by measurements of the optoelectronic sensor. The invention is therefore also particularly suitable for more demanding logistical applications in which a larger number of RFID readers is used.

The invention is based on the principle in this respect of suppressing possible incorrect readings directly at the source. The problem-prone and complex and/or expensive processing of a high amount of RFID information can already be reduced to a manageable degree beforehand by use of a more powerful, but still cost-favorable optoelectronic sensor which replaces the conventional light barrier.

The control is advantageously made only to activate the reading device when the object carries out the preset movement pattern at least in part. As stated in the introduction, the number of the available channels is limited. If each RFID reader is only active for a small part of the time, namely while it has to read actually relevant information, this limited resource of the available channels is used directly and effectively. This accelerates the reading procedures because it is not necessary to search for a free channel and it cuts the possibility of incorrect readings due to the far range of the reading devices to a significant degree. The number of the RFID readers which can be used next to one another without coordination problems can thus be substantially higher.

The preset movement pattern preferably has a direction of movement. A large number of movement patterns which can trigger an incorrect reading can already be recognized via the direction of movement. This includes the passage through a reading gate in the wrong direction, but also a movement reversal, during or after the actual reading procedure.

In an advantageous further development, the control is made to discard read out information if the object does not completely carry out the preset movement pattern. The decision whether an object has to be read out at all should be made when the object is located in close spatial proximity to the reading device. If, however, the movement pattern is not completed thereafter, this read out information would result in an incorrect reading. Since incorrect data is discarded right from the start, this risk is precluded.

The optoelectronic sensor and/or the control is preferably made for the determination of a geometry class, with in particular a person, a loaded or unloaded loading unit such as a pallet respectively forming a geometry class. In addition to the movement pattern, the geometry class is herewith used as a second criterion for the decision whether a reading should be carried out. In the normal case, neither an unloaded pallet nor a person should trigger a reading. It is furthermore possible to configure a reading gate especially for specific object classes such that it, for example, only reads out packages of a specific size and lets everything else pass without registering it. The error rate can be reduced again in this manner.

Even more preferably, the control is made only to activate the reading device for objects of a preset geometry class and/or only to evaluate the read out information of an object of a preset geometry class. In this manner, the geometry information with a direct temporal relationship to the reading is evaluated and an object having a geometry classified as irrelevant is either not read out at all, in that the reading device remains deactivated, or is at least directly discarded.

In a preferred embodiment, the optoelectronic sensor is a laser scanner which can in particular monitor a monitored plane divided into fields. Such a laser scanner is able to determine the position of an object approaching the reading device with reference to the distance and to the scan angle. The movement pattern can thus selectively be determined and/or evaluated as a finely resolved trajectory, but alternatively, for the simpler evaluation and classification of the movement pattern, also only via a number of predefined fields. Fields in the working plane of laser scanners are freely definable regions in the geometrical shape. These regions are checked for objects within their contours. If objects are present within the selected contour, they can be displayed via corresponding interfaces such as switch outputs or telegrams.

Even more preferably, the movement pattern is fixed via an order of the fields contacted sequentially by the object and/or via the geometry class with reference to the fields simultaneously swept over by the object. It is sufficient for many applications only to record more coarse information on the movement and geometry in this manner. This facilitates the association with a movement class or with a geometry class and thus reduces the error rate and the evaluation effort.

In a particular embodiment, the preset movement pattern is fixed in this connection by the entering into a first field, the movement into a second field first and then into a third field and the exiting of the third field, with the control in particular being made only to activate the reading device on the movement into the second field and/or to discard the read out information when the object does not first move into the third field and subsequently leave it after activation of the reading device. In this embodiment, the monitoring of only three fields is therefore sufficient. It can thus already be reliably determined whether an object has actually entered the reading zone and whether it has also left it again in the correct direction. The reading device is activated, i.e. is only activated, when an object comes into its proximity from the correct direction and, provided the object then does not complete the movement pattern and exits the reading gate on the oppositely disposed side, the read out information is discarded since it is irrelevant.

The control is advantageously made to determine and record the travel path of vehicles carrying objects by means of a transponder of the vehicle. Not only the objects themselves, that is the goods in usual logistical applications, but also the means of transport are provided with a transponder here. It facilitates the planning for the central control of the logistics hall if the position of the means of transport are known at every point in time.

In a further advantageous embodiment, the control has a memory for read out information and is made to discard read out information if it is identical to information already read out earlier. In this case, it can namely be assumed that the currently read transponder is read based on far range and is not even located in the reading gate. An exception to this is when the transponder is located at a means of transport, when these means of transport are known to the control and are excepted from this advantageous further development.

A plurality of optical sensors, in particular a plurality of laser scanners, are preferably provided and these sensors have fields in at least two rows disposed next to one another for the recognition of more complex movement patterns and/or in at least two planes disposed next to one another for the recognition of more complex geometry classes. Reading gates can thus be realized in which the movement patterns of objects passing the reading gate next to one another can also be monitored. In the case of planes disposed above one another, it can, for example, not only be recognized whether a pallet is loaded, but also how high it is loaded.

In all these cases, only one object is always addressed. It is, however, also possible in accordance with the invention for a means of transport to convey a plurality of objects which each have a transponder. These transponders can then be read out simultaneously or sequentially while they pass the proximity of the reading device.

The method in accordance with the invention can be designed in a similar manner by further features and shows similar advantages. Such further features are described in an exemplary, but not exclusive manner in the dependent claims following the independent claims.

Figure 2:
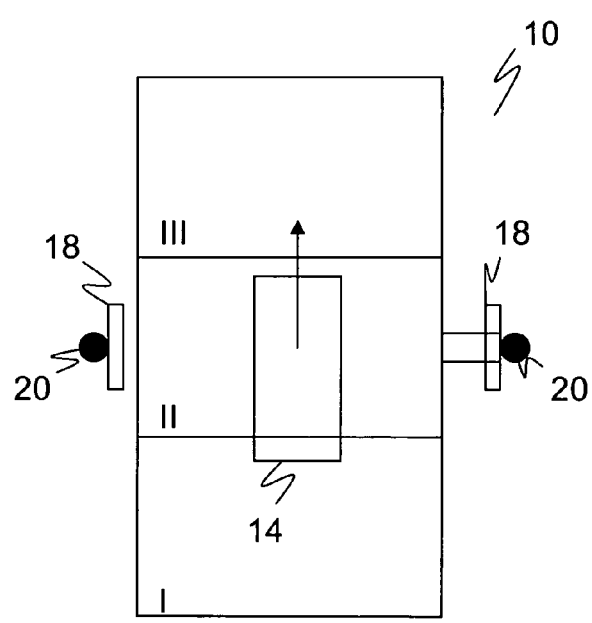
Figure 3:
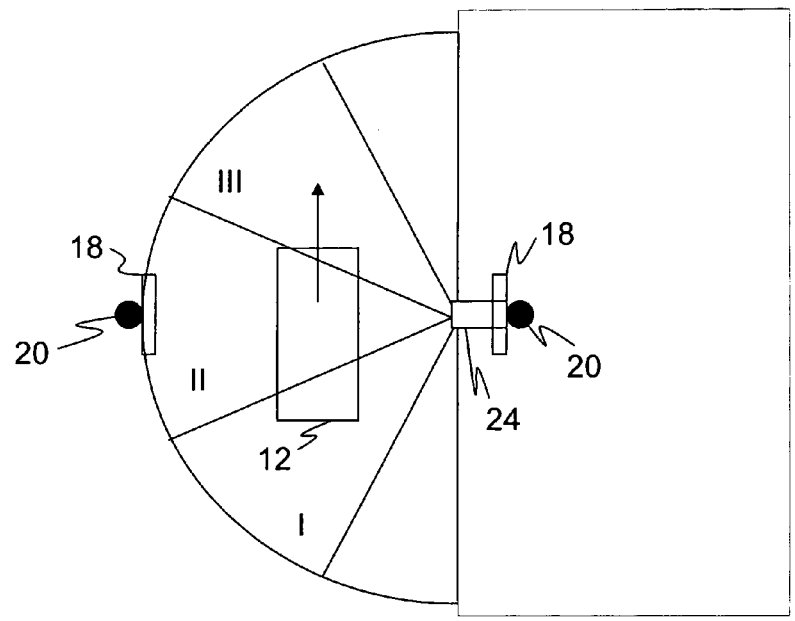
Figure 4:
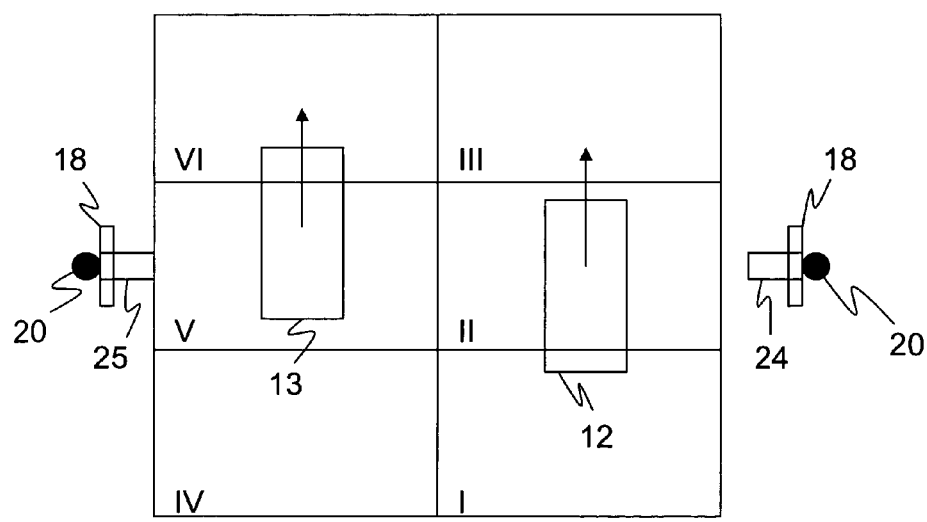
Figure 5:
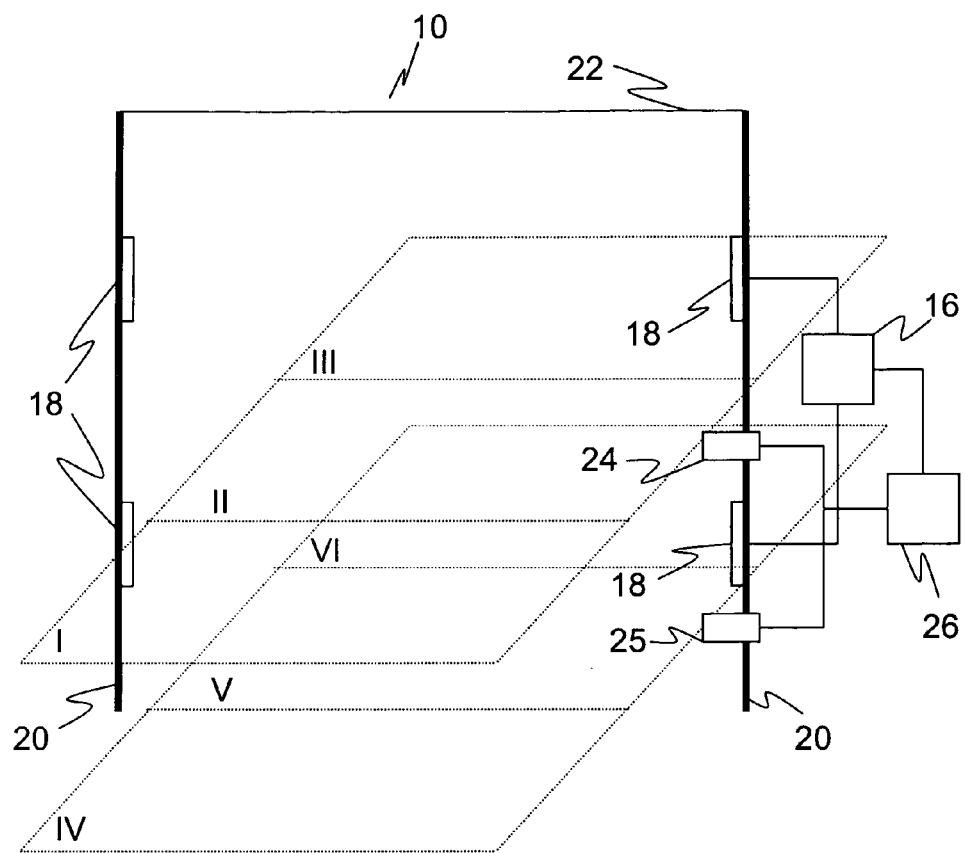

The invention will also be explained in the following with respect to further advantages and features with reference to the enclosed drawing with reference to embodiments. The Figures of the drawing show in:

FIG. 1 a schematic three-dimensional representation of a reading gate in an embodiment of the device in accordance with the invention having a reading device and an optoelectronic sensor;

FIG. 2 a plan view of the reading gate in accordance with FIG. 1;

FIG. 3 a plan view of a second embodiment of the invention with a monitored plane of the optoelectronic sensor limited by an arc;

FIG. 4 a plan view of a third embodiment of the invention with two oppositely arranged optoelectronic sensors and their double row of monitored fields; and FIG. 5 a schematic three-dimensional representation of a fourth embodiment of the invention with two optoelectronic sensors arranged above one another and their monitored planes arranged above one another.

FIG. 1 shows a first embodiment of a device in accordance with the invention in a schematic three-dimensional representation in FIG. 1 and in a plan view in FIG. 2 for the reading out of information for the identification of an object 12, for example a pallet, a package or any desired good (logistical unit), carrying a transponder 14 containing the information. For this purpose, a reading device 16 radiates an electromagnetic field via antennas 18, said field either exciting the transponder 14 to actively radiate the stored information or being changed in the transponder 14, with this change or the information radiated back in turn being recognized via the antennas 18. This type of reading out of a transponder 14, also called an RFID tag, via a corresponding reading device 16 or via an RFID reader, is basically known and the invention does not require any special implementation of the RFID technology. In a preferred embodiment, however, the ultrahigh frequency RFID technology is used with a backscatter transponder.

The device 10 forms a reading gate as a whole, with the antennas 18 being attached to its lateral posts 20. The crossmember 22 likewise shown connects the antennas 18 electrically to both sides. Such a crossmember 22 is, however, not absolutely necessary. The electrical connection between the antennas 18 and to the reading device 16 can also take place in another manner; for example, by a simple line laid at the base or also in a wireless manner. Without this crossmember 22, the reading gate 10 takes up a lot less space and can therefore not be damaged by objects passing through and is easier to assemble or disassemble.

An optoelectronic sensor 24 is attached to a side post 20. The sensor 24 monitors the passage region through the reading gate 10 in its range of view. It is able to determine the position of the object 12. In the embodiment shown, this sensor is a laser scanner whose scanning beam is incident onto the object 12 at a known angle and can also recognize at what distance this takes place. For this purpose, the time of flight of light from the sensor 24 to the object 12 and back is measured. The range of view of the sensor 24 is a plane which is preferably disposed horizontally ad is divided into fields I-III. In a simplified embodiment, the sensor 24 then does not determine the exact position of the object 12, but only in which of the fields I-III the object 12 is then currently disposed. As an alternative to a laser scanner, the sensor 24 can, for example, also be a camera which, by means of an image evaluation, is likewise able to determine the position of the object 12 or the field I-III in which the object 12 is disposed.

Both the reading device 16 and the sensor 24 are connected to a control 26 of the reading gate 10. Alternatively, the control 26 can be part of the sensor 24 or part of the RFID reader 16. The sensor 24 transmits the precise position of the object 12 or the field I-III then currently occupied by the object 12 to the control 26. In addition, the sensor 24 can be made to measure the contour of the object 12 geometrically and to likewise transmit these data to the control 26. The RFID reader 16 can be addressed by the control 26 to read out the transponder 14 and to return the information determined in this manner to the control 26.

The reading out method in accordance with the invention in the device 10 then runs as follows. The object 12 moves through the reading gate 10 in the direction indicated by the arrow. For this purpose, the object 12 can be arranged on a vehicle not shown in the Figures. This vehicle or means of transport can, on the one hand, have a transponder 14 which is read out by an RFID reader and thus makes it possible at any time to know the position of the means of transport and thus to track its travel path. As soon as the object 12 comes into the range of view of the sensor 24, this sensor 24 determines the position of the object 12 and reports positional data to the control 26 for as long as the object 12 is in the range of view. These positional data can be three-dimensional coordinates in space, but can also only be the field I-III then currently occupied by the object 12. In addition, the sensor 24 can determine a contour of the object 12.

The control 26 compares the movement of the object 12 reported by the sensor 24 with a preset movement pattern. The control 26 activates the reading device 16 in response to a specific movement pattern. The reading device 16 therefore excites the transponder 14 to radiate the identification stored there and sends this information back to the control 26. In a preferred embodiment, the movement patter resulting in the activation of the reading device 16 is a movement of the object 12 from a specific direction under the reading gate 10 in direct proximity to the reading device 16. After the reading out by the reading device 16, the control 26 continues to compare the movement transmitted by the sensor 24 with the preset movement pattern. If they do not agree, the read out information is discarded. With the preferred embodiment just addressed, the preset movement pattern is the further movement of the object 12 through the reading gate 10 to the other side and the subsequent exiting of the reading gate 10.

The information from the transponder 14 is thus either not read out at all or is at least not evaluated on a deviating movement of the object 12 from the expected movement. The RFID reader 16 is only active when an object 12 to be identified by it is in the preset reading position. The time window within which different objects than the object 12, whose information should not be read at all, could result in association errors at a greater distance is thereby kept small.

In addition to the comparison with a preset movement pattern, the control 26 is also able to evaluate geometrical information on the object 12. This can be assessed via a finely resolved contour line of the object 12, but also via a comparatively coarse geometry information with reference to the fields I-III simultaneously swept over by the object 12. The control 26 thus distinguishes between objects 12 which should be read and interfering objects such as passing operators or empty pallets. If such an interfering object is recognized, the reading device 16 remains deactivated or the information read out by it is discarded.

In a typical exemplary application based on the fields I-III of a laser scanner 24, the expected preset movement is first the entry of the object 12 into the field I which subsequently leaves the field I in the direction of field II. The RDIF reader 16 is only activated and the transponder 14 read out in response to this sequence field I-field II. If the object 12 leaves the field I in a different direction than toward field II, the reading device 16 remains deactivated. Only if the object 12 leaves field II toward field III and subsequently also leaves field III is the information read out by the controller 26 associated with the object 12. If the object moves from field II to field I, the read out information is discarded. On a movement from field III to field II, nothing initially happens since it is necessary to wait and see whether field II is exited in the direction of field I—in this case, the read information is discarded—or whether the movement pattern is still completed after all in a further approach and the association can be carried out.

FIG. 3 represents a second embodiment of the invention in a plan view. In all the Figures, the same reference numerals designate the same features. This second embodiment differs from the first embodiment in that the monitored plane is limited by an arc which describes a semicircle in the case shown. Fields I-III are likewise not rectangles, but segments of a circle. It is substantially easier for the laser scanner to monitor such fields I-III because the segment alone is determined by the scan angle. The reading method is the same as has been described in connection with the first embodiment and with FIGS. 1 and 2. Basically, any further definition of fields is possible to define a preset movement pattern. This depends on the application, the required simplicity of the evaluation and the precision of the movement to be prescribed which should trigger a reading process. It is explicitly emphasized that a laser scanner can recognize and monitor any desired shapes of the fields, that is segments of a circle, rectangles or others in that the polar coordinates measured via angle and distance are used which completely sweep over the monitored plane.

FIG. 4 shows in a plan view a third embodiment of the invention in which an optoelectronic sensor 24, 25 is installed at both sides of the reading gate 10. A second optoelectronic sensor 25 for the larger number of fields I-VI used here would not be necessary since the optoelectronic sensor 24 also knows the distance of the object 12 and could thus carry out a corresponding division on its own. It is, however, only possible with a second optoelectronic sensor 25 to track movements of a second object 13 which is located in the shadow with respect to the first optoelectronic sensor 24 and can only be read by the second optoelectronic sensor 25. Two objects 12, 13 moved through the reading gate 10 next to one another can thus also be identified by the same reading device 16 with an unambiguous association of the object 12, 13 with the read out information.

In a fourth embodiment, which is shown schematically three-dimensionally in FIG. 5, two optoelectronic sensors 24, 25 are arranged over one another. It is possible in this manner to obtain more precise information on the object geometry in the vertical dimension and thus to distinguish better between object to be read and objects not to be read. One application is the particularly reliable determination of the degree of loading of a pallet.

Association errors only occur substantially less commonly between information read out of the transponder 14 and the associated object 12 due to the monitored movement pattern and the object geometry. It can nevertheless not be precluded that a further transponder is also still in reading range at the moment at which the reading device 16 is activated due to a recognized movement pattern. To combat the errors occurring from this, the control 26 can store information previously read from earlier transponders 14 and compare it with then currently read out information. If a transponder is then detected on a plurality of passages, this can be recognized and sorted out by way of software, provided that it is not the transponder of a means of transport which is permitted to make a plurality of passages.

Even though only one object 14 is shown in each case in the Figures, it can be a logistical unit such as a pallet on which a larger number of objects are arranged which each carry their own transponder. The reading device 16 is then able to read out all these transponders and to associate the thus identified objects of the pallet.

Beyond the described transponders at goods and vehicles, there are also static transponders which are therefore fixedly attached to a location such as a machine, a shelf or the like. Such static transponders do not run through any fields or trajectories and are therefore excluded from the evaluation in accordance with the invention. It is simpler to provide suitable filters which recognize the transponder as static because, for example, it is read for longer than a specific minimum time in order thus to preclude it as not relevant right from the start. For this purpose, information on or from static transponders can be stored in the named memory or in a further memory of the control in order to be able to filter it effectively.

Overall, it becomes possible in accordance with the invention only to keep the individual RFID systems active when they are actually used and only to read out such objects which are brought into a preset reading position and which should also actually be read out based on their movement pattern. In addition, it is ensured via geometry properties that generally only objects to be readout such as a loaded pallet, or whatever is defined as a relevant object, are registered by the RFID system. The evaluation effort is thereby very substantially reduced and simultaneously the reading rate increased, that is the identification of the respective correct object, particularly in more complex applications having a larger number of RFID readers.

The invention claimed is:

1. A device for the reading out of information from a transponder arranged at an object, said device comprising:
   an optoelectronic sensor;
   a reading device able to excite the transponder to radiate the information and able to read out the radiated information; and
   a control which is made for a control of the reading device and of the sensor as well as for an evaluation of the read out information, characterized in that
   the optoelectronic sensor comprises a laser scanner which can monitor a monitored plane divided into multiple fields and can determine a movement pattern of the object, said movement pattern fixed over an order of the fields contacted sequentially by the object;
   and in that the control responds to the movement pattern of the object to evaluate the read out information only with objects of a preset movement pattern, whereby the optoelectronic sensor determines a movement pattern of the object, with the control using the determined movement pattern to only evaluate the read out information in the case of the object displaying a preset movement pattern as determined by the optoelectronic sensor and disregard read out information if the object does not carry out the preset movement pattern.

2. A device in accordance with claim 1, wherein the control is made only to activate the reading device when the object carries out the preset movement pattern at least in part.

3. A device in accordance with claim 1, wherein the preset movement pattern comprises a direction of movement.

4. A device in accordance with claim 1, wherein the control is made to discard read out information if the object does not completely carry out the preset movement pattern.

5. A device in accordance with claim 1, wherein the optoelectronic sensor and/or the control is/are made for the determination of a geometry class; and wherein in particular a person, a loaded loading unit or an unloaded loading unit such as a pallet respectively forms a geometry class.

6. A device in accordance with claim 5, wherein the control is made to activate the reading device only for objects of a preset geometry class and/or only to evaluate the read out information of an object of a preset geometry class.

7. A device in accordance with claim 6, wherein the geometry class is fixed with reference to the fields simultaneously swept over by the object.

8. A device in accordance claim 1, wherein the preset movement pattern is fixed by the entry into a first field, the movement into a second field first and then into a third field and the exiting of the third field, with the control in particular being made only to activate the reading device on the movement into the second field and/or to discard the read out information if the object does not first move into the third field and subsequently exit it again after the activation of the reading device.

9. A device in accordance with claim 1, wherein the control is made to determine and to record the travel path of vehicles carrying objects by means of a transponder of the vehicle.

10. A device in accordance with claim 1, wherein the control comprises a memory for read out information and is made to discard read out information if it is identical to information already previously read out.

11. A device in accordance with claim 1, wherein a plurality of optical sensors (24, 25), in particular a plurality of laser scanners, are provided and these sensors comprise fields in at least two rows disposed next to one another for the recognition of more complex movement patterns and/or in at least two planes disposed above one another for the recognition of more complex geometry classes.

12. A method for the reading out of information from a transponder arranged at an object by means of a reading device which excites the transponder to radiate information and which reads out the radiated information, the method comprising
   determining a movement pattern of the object by means of a laser scanner, the laser scanner having a range of view divided into multiple fields, said movement pattern fixed over an order of the fields contacted sequentially by the object, whereby the laser scanner determines a movement pattern of the object;
   using the transponder to read out the radiated information, in response to the determined movement displaying a preset movement pattern as determined by the laser scanner by using the determined movement pattern to only evaluate the read out information in the case of the object displaying a preset movement pattern as determined by the laser scanner and disregarding read out information if the object does not carry out the preset movement pattern.

13. A method in accordance with claim 12, wherein the reading device is only activated when the object carries out the preset movement pattern at least in part and/or read out information is discarded when the object does not completely carry out the preset movement pattern.

14. A method in accordance with claim 12,
   wherein a geometry class is determined; and wherein in particular a person, a loaded loading unit or an unloaded unit such as a pallet respectively form a geometry class; and wherein the reading device is only activated for objects of a preset geometry class and/or only the read out information of an object of a preset geometry class is evaluated.

15. A method in accordance with claim 12,
   wherein the geometry class is fixed with reference to the fields simultaneously swept over by the object, with fields being provided in at least two rows disposed next to one another for the recognition of more complex movement patterns and/or in at least two planes for the recognition of more complex geometry classes in particular while using a plurality of optoelectronic sensors.

16. A method in accordance with claim 12, wherein the preset movement pattern is fixed by the entry into a first field, the movement into a second field first and then into a third field and the exiting of the third field, with in particular the reading device only being activated on the movement into the second field and/or the read out information being discarded if the object does not move into the third field first and subsequently exit it after the activation of the reading device.

17. A method in accordance with claim 12, wherein the read out information is discarded when it is identical to stored information already read out previously.

* * * * *